Patented Feb. 20, 1923.

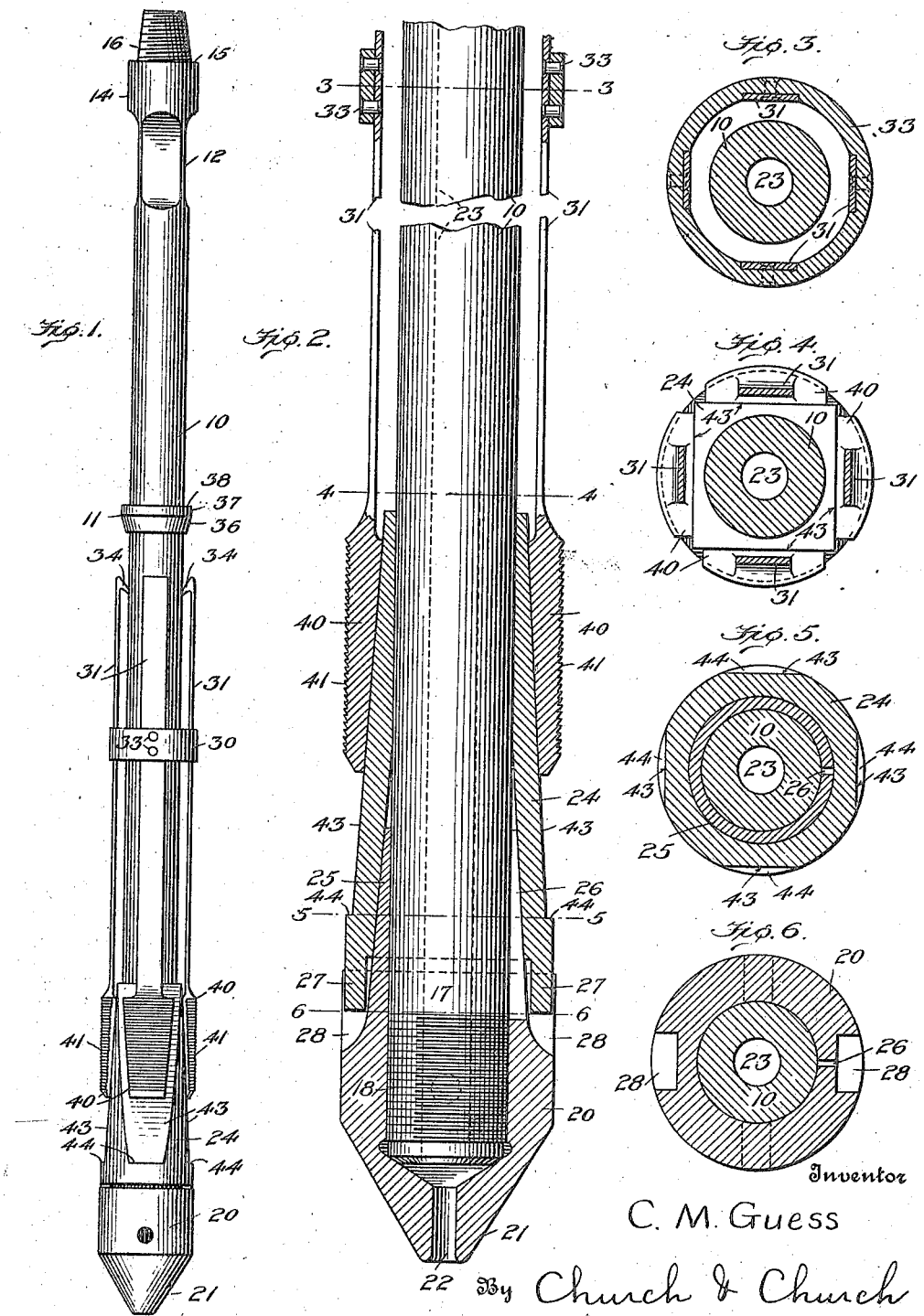

1,445,680

UNITED STATES PATENT OFFICE.

CHESTER M. GUESS, OF LOS ANGELES, CALIFORNIA.

CASING SPEAR.

Application filed February 19, 1921. Serial No. 446,341.

*To all whom it may concern:*

Be it known that I, CHESTER M. GUESS, a citizen of the United States, residing at Los Angeles, in the county of Los Angeles and State of California, have invented certain new and useful Improvements in Casing Spears; and I do hereby declare the following to be a full, clear, and exact description of the same, reference being had to the accompanying drawings, forming part of this specification.

This invention relates to a spear for use with oil well equipment and has particular application to devices used for pulling pipe or casing from a well when it is desired to remove such pipe or casing at any distance below the surface.

The principal object of the present invention is to provide a spear that can be disassembled when the spear becomes stuck, this disassembling being in such manner that the individual parts of the spear which are left in the casing upon removal of the stem may be readily fished out, thus avoiding all danger of losing a hole by the plugging of same by the spear.

A further object of the present invention is to provide a combination washdown trip spear that will be applicable for use either in pulling pipe or casing with an ordinary application of force, as with a lifting hoist or with a walking beam and a pair of jars, the latter construction pulling the spear with a jerk, giving a resulting force which is a combination of pulling and giving of hammer blows.

Still further objects of the invention will be apparent from the following description and the claims and relate particularly to the pilot head or retaining member per se, the wedge itself and its combination with the retaining head and the double use of the collar carried by the stem.

In all of the present types of spears with which I am familiar the wedge and stem are integral and all of them have the disadvantage that when once the spear secures its bull-dog hold on the pipe, it is not possible to disassemble the tool without plugging the hole with the stuck slips and allied members. Valuable wells have been lost in this way, the spear so plugging the hole that it was not possible to pass it with an instrument, or to break up the spear owing to the rocky or other difficult formation of earth.

In the present device means are provided for flushing the pipe or casing with water so as to free the string from mud formations so that, no matter what the depth, these fishing tools may be inserted without difficulty even though rocky formations or the more difficult combination of rock and mud.

In the drawings,—

Figure 1 is an elevation of a combination washdown trip spear constructed in accordance with the present invention.

Fig. 2 is an enlarged central sectional view through the lower end thereof.

Fig. 3 is a transverse section on line 3—3 of Fig. 2.

Fig. 4 is a transverse section on line 4—4 of Fig. 2.

Fig. 5 is a transverse section on line 5—5 of Fig. 2.

Fig. 6 is a transverse section on line 6—6 of Fig. 2.

The stem 10 is generally cylindrical throughout its extent, except for collar 11 to be described in detail later and the usual attaching end consisting of a squared portion 12 just below the cylindrical enlargement 14 which forms a shoulder 15 with the standard tapered threaded tool point 16. At its lower end 17 the stem is threaded as at 18 to receive a retaining member or pilot head 20, the latter having a cone-shaped point 21 provided with a small central orifice 22 of approximately half the diameter of the central bore 23 of the stem, in order to increase the velocity of the water at the end of the string.

This pilot 20 is preferably of slightly greater diameter than any other part of the spear, although this is not essential. It is, however, quite desirable that the pilot shall be at least as large in diameter as the wedge and that the diameter of the gripping teeth when in collapsed position shall be slightly greater than the ring that holds the reins.

The wedge 24 has a cylindrical bore in case the spear is used with the rotating string, but if used with the jar, as in the example shown, the bore of the wedge is tapered at about the rate of one inch per foot for an eight inch spear, this tapered bore receiving the hollow cone extension 25 of the pilot, this extension being slit as at 26 so as to tightly bind against the stem and to provide a more frictional engagement between the generally circular wedge 24 and the pilot, the latter being threaded to the stem, as previously described. At the lower end of the wedge are provided a plurality of teeth 27 shown in the drawings as two in number, each fitting within a square slot 28 in the pilot 20, thus forming a connection which prevents relative rotation of the pilot and wedge when the parts are in the position shown in Fig. 1. At its smaller end, the wedge is machined to fit snugly upon the stem 10, but to slide freely thereon.

A ring 30 surrounds the stem 10 at a point between the collar 11 and the wedge 24 and loosely carries a plurality of reins 31 which are secured to the ring in any desired manner, such for example as the loose rivet connections 33, the looseness being desirable in order to permit a slight pivoting of the reins in the ring. At its upper end each rein carries a down-turned hook 34 of the usual type and adapted to slide up the tapered portion 36 of the collar over its cylindrical portion 37 and to engage against the shoulder 38 which may be either flat as shown, or else slightly dished, as is a little more customary in the art. The diameter of the cylindrical portion 37 is slightly less than the minimum inside diameter of the ring 30 which is the distance between the inner faces of opposite reins 31, as seen in Fig. 3.

The gripping member is composed of a plurality of slips 40 each bounded by a plane face on the stem side and by a cylindrical toothed surface 41 of standard construction on the outside. Each of the four slips 40 is connected to or is integral with one of the reins 31 and slides upon one of the plane inclined surfaces 43 of the one-piece wedge 24. A shoulder 44 is provided between the cylindrical larger end of the wedge and the flat tapered surface 43 in order to prevent the slips from overrunning the wedge.

The operation is as follows: The spear is let down into the well to a point below the casing to be removed and the spear is then jerked upward. The pilot 20 and stem 10 being then practically integral will rise carrying with them the wedge 24, which while slidable upon the stem 10, nevertheless rests by gravity against the pilot and is held against rotation by the tooth and slot connection mentioned. The rising of the wedge member spreads the slips against the slight yielding resilience of the reins and drives the four tripping members into contact with the casing. The casing is then hoisted from the well in the normal manner unless such obstruction is encountered as to render it impossible to move the casing. In such cases, when the spear has become stuck and it is not possible from the surface to move it either up or down, the stem 10 is rotated right-handed which frees the pilot member, since the threads which hold this member to the stem are left-handed. The pilot or retaining member is held to the wedge by frictional contact, but this frictional contact is intentionally very much less than the frictional contact between the wedge and the slips, so that it is always possible to drive down the point or head and then free it by this unscrewing, even though it is not possible to drive down the slips or the wedge. The stem is now jarred against the wedge by striking the collar 11 against the upper smaller end of the wedge which drives the latter downward and frees the slips. At this time the stem is drawn upward until the hooks 34 engage the shoulder 38 of the collar so that when the stem is withdrawn from the well the slips accompany it, leaving the wedge fast in the hole and the pilot member either at the bottom of the hole or at some distance below. The later fishing out of the hollow wedge with suitable tools is a simple matter as is also the rescue of the pilot head, since the latter is of such shape that it always remains vertical in the hole.

What I claim is:

1. In a casing spear, a stem, slips slidable thereon, a retaining member detachably secured to said stem, and means for holding said slips and said retaining member in fixed relation so that said retaining member may be detached from said stem when the slips are stuck in the well.

2. In a casing spear, a stem, slips slidable thereon, a retaining member detachably secured to said stem, and means carried by said stem between said slips and said retaining member for holding said slips and said retaining member in fixed relation so that the said retaining member may be detached from said stem.

3. In a casing spear, a stem, a retaining member threaded to the lower end of said stem, a wedge member slidable on said stem and having a locking engagement with said retaining member, and slips engageable with said wedge.

4. In a casing spear, a stem, a pilot member threaded thereto, a tapered wedge slidable on said stem, means for locking said wedge and said pilot against relative rotation, slips slidable on the tapered surface of said wedge, and means carried by said stem for pulling said slips away from said wedge and withdrawing said wedge away from said slips when the latter are in locked position.

5. In a casing spear, a hollow stem, a pilot member threaded thereto and having a discharge orifice therethrough, a plurality of slips slidable with respect to said stem, and a hollow member surrounding said stem and adapted to hold said slips and said pilot member in fixed relation when the spear is stuck in the well.

6. In a casing spear, a stem, a collar on said stem, a wedge member having a tapered surface, a slip slidable on said tapered surface and past the smaller end thereof, means carried by said slips for engaging said collar, whereby said slips may be pulled from engagement with said wedge.

7. In a casing spear, a stem, a tapered wedge slidable on said stem, a shoulder on said stem limiting longitudinal movement of said wedge in one direction, a retaining member on said stem limiting longitudinal movement of said wedge in the opposite direction, and a plurality of slips slidable with respect to said stem and receiving between them the smaller end of said tapered wedge.

8. In a casing spear, a stem, a tapered wedge slidably mounted on said stem and having a tapered bore, a retaining member detachably secured to said stem and having a tapered projection adapted to frictionally engage the tapered bore of said wedge, and slips slidable on said wedge.

9. In a casing spear, a stem, a collar on said stem, a ring loosely mounted on said stem and adapted to pass said collar, a plurality of slips carried by said ring, a wedge member slidably mounted on said stem and adapted to engage with said collar, and means carried by said ring to engage said collar to withdraw said slips from said wedge.

10. A wedge for a casing spear characterized by the provision of a tapered bore and a sloping outer face.

11. A wedge for a casing spear characterized by the provision of a cylindrical bore at its smaller end adapted to slidably receive a spear stem and by the provision of a sloping slip-engaging face unrestricted at its smaller end and bounded by a shoulder at its larger end.

CHESTER M. GUESS.